Patented Dec. 24, 1929

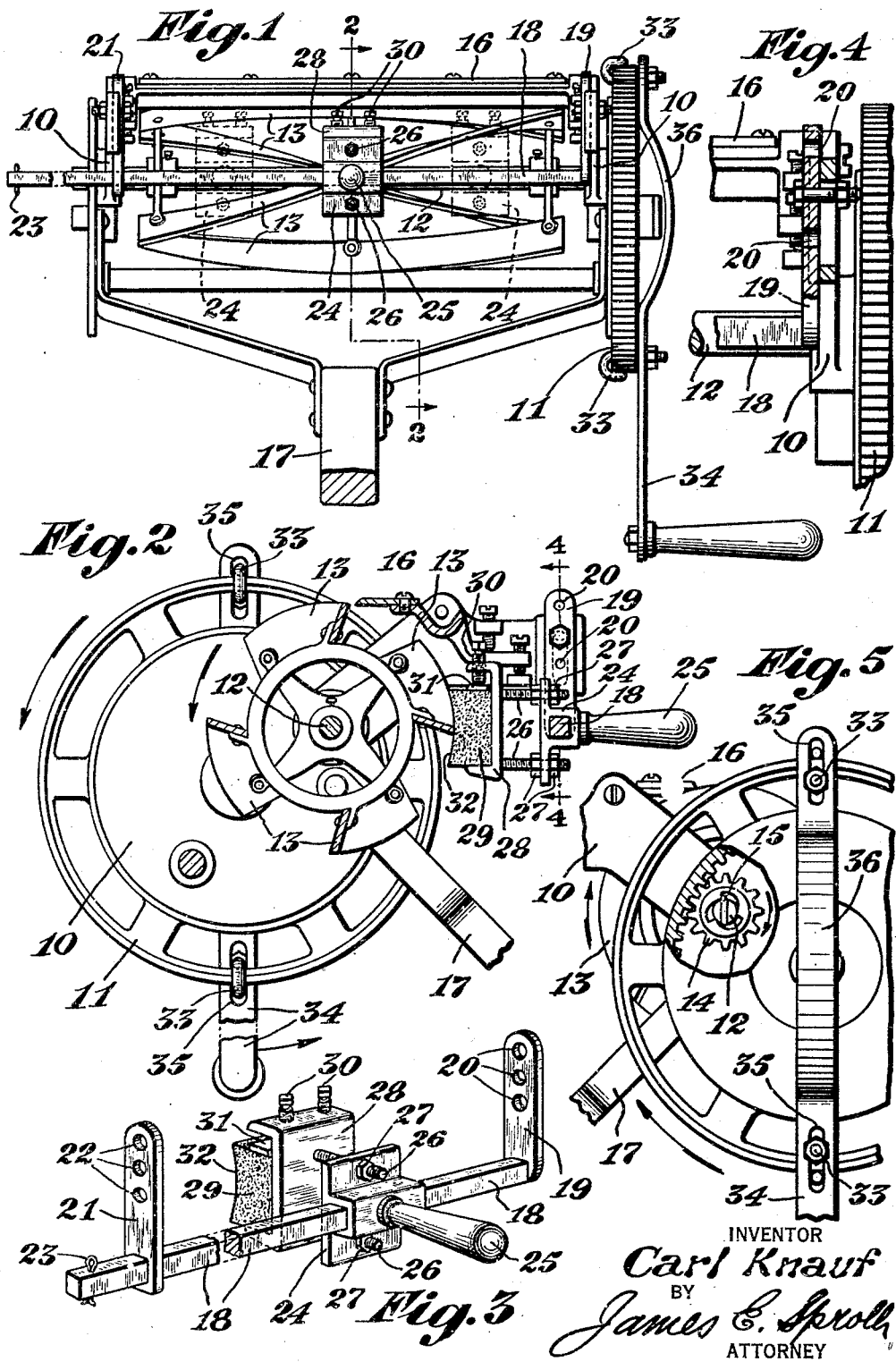

1,740,464

UNITED STATES PATENT OFFICE

CARL KNAUF, OF KIRKLAND, WASHINGTON

LAWN-MOWER-SHARPENING APPARATUS

Application filed May 29, 1926. Serial No. 112,434.

The primary aim of the present invention is the provision of sharpening apparatus especially designed for use and employment with lawn mowers and the like, whereby the cutting edges of the spiral cutting blades are accurately and positively sharpened or abraded in a uniform circumferential plane and the operation of sharpening such blades is more expeditiously and rapidly accomplished than has heretofore been attainable with the various sharpening devices now in general use.

The invention contemplates retaining the spiral cutting blades in operative and rotative position within the lawn mower during the sharpening or abrading operation of the cutting edges of said blades and abrading of said edges concurrently with the rotating of the blades.

With the foregoing in view the invention essentially resides and is more particularly concerned in the provision of sharpening apparatus for lawn mowers, and in the preferred embodiment thereof is characterized by the employment of a longitudinally adjustable guide bar disposed in spaced parallel relation to the rotative spiral cutting blades of the lawn mower and mounted for vertical adjustment adjacent the ends thereof upon the lawn mower frame; of a crosshead slidably mounted for reciprocation upon the guide bar; of a holder adjustably secured upon the inner face of said crosshead; of an abrading block removably secured within said holder for tangential contact with the cutting edges of the said blades; and of novel means for rotating such blades concurrently with the manual reciprocation of the abrading element during a sharpening operation, all of which are important elements of the invention and are to be correlated in the broad aim of enhancing the efficiency of the apparatus for general use.

The above, and additional objects which will be hereinafter more specifically treated are attained by such means as are shown in the accompanying drawings, described in the following specification and then more clearly pointed out in the claims, which are appended hereto and form a part of this application.

With reference to the drawings, in which there is illustrated one embodiment of the invention, and throughout the several views of which like characters of reference designate similar parts.

Figure 1 is an elevation of an inverted lawn mower having the sharpening apparatus comprehended by the present invention operatively attached thereto;

Fig. 2 is a transverse section of the same taken through 2—2 of Fig. 1;

Fig. 3 is a perspective view of the apparatus detached from the lawn mower;

Fig. 4 is a fragmentary vertical section taken through 4—4 of Fig. 2; and

Fig. 5 is a fragmentary end elevation of the lawn mower with certain parts omitted and certain other parts broken away for clarity of illustration.

Before taking up the detailed description of the drawings, a general exposition of the specific purposes and functions of the sharpening apparatus evolved by the present invention will be undertaken. Heretofore in sharpening the cutting edges of the rotative spiral cutting blades of lawn mowers, such cutting edges were separately or individually sharpened, which mode of sharpening same often resulted in lack of uniformity or unevenness of the cutting edges of the several blades, certain of said cutting edges being out of circumferential alignment, that is to say being either above or below a uniform circumferential plane, which necessitated setting or adjusting the cutting edge of the correlated tangential horizontal knife to the plane of the edge or edges projecting beyond said uniform circumferential plane, thus rendering it impossible for the remaining edges to contact with the horizontal knife, resulting in irregular and uneven cutting of the grass, by reason of the fact that the spiral cutting edges out of shearing contact with the horizontal knife would permit the blades of grass to pass therebetween without being sheared or cut, thereby leaving unsightly tufts of grass on the lawn. It is therefore the principal purpose and function of the present apparatus to remedy and rectify such conditions by accurately abrading or sharpening the cutting edges of the rotative spiral cutting blades of lawn mowers in uniform circumferential planes, while the said blades are operatively and rotatively positioned within their associated mowers, to thus definitely and positively insure of each of said blades having shearing contact throughout its length with the correlated tangential horizontal knife thereof.

Beginning the more detailed description of the invention by reference to the drawings, the numeral 10 designates the interconnected end frame members of the lawn mower, 11 a drive wheel thereof, 12 the driven shaft of same having spiral cutting blades 13 rigidly secured thereon, 14 a reversely disposed pinion mounted on the end of said shaft and meshing with the internal gear teeth of said drive wheel 11, 15 a reversely disposed dog for imparting the rotary motion of said pinion to said shaft, 16 the vertically adjustable bed or tangential horizontal knife, and 17 the pivotally mounted handle of the lawn mower, all of which are correlated and function in a well known manner with the other primary elements of the lawn mower, which will be recognized from the drawings without description.

The numeral 18 designates a guide bar, rectangular in cross-section, having at one end thereof a flattened bar securing portion 19 bent to extend upwardly therefrom in perpendicular relation thereto, and provided adjacent the upper end with a series of spaced aligned apertures 20. Slidably disposed for longitudinal adjustment upon the opposite end of the guide bar 18 and extending upwardly therefrom in perpendicular relation thereto is a flattened bar securing member 21 provided adjacent the upper end with a series of spaced aligned apertures 22.

In practice the guide bar 18 is preferably formed of sufficient length to accommodate any type of lawn mower having any length of spiral cutting blades, and the member 21 of said guide bar is longitudinally adjusted thereon to conform and fit the guide bar to the specific or selected lawn mower to be sharpened. The apertured portion 19 and apertured member 21 of the guide bar 18 facilitate the attachment of the bar to the slotted rear terminals of the lawn mower end frame members 10 and the vertical adjustment of said bar thereon, subsequent to the detachment of the vertically adjustable wooden roller of the lawn mower therefrom for an abrading operation upon the cutting edges of the spiral cutting blades 13. The upper apertured ends of the portion 19 and member 21 are designed to be secured in selective vertically adjusted positions upon the said terminals to dispose the guide bar 18 in fixed spaced parallel relation to the spiral cutting blades 13 with the axis of said bar in the same horizontal plane as the axis of the driven shaft 12. A stop or split pin 23 seated within the terminal portion of the adjustable end of the guide bar 18 serves and functions thereat to retain the member 21 upon the said guide bar, as will be manifest and apparent.

Slidably mounted upon the guide bar 18 is a manually reciprocable crosshead 24 having a handle 25 rigidly secured to the outer or rear face thereof and extending rearwardly therefrom in perpendicular relation thereto. Adjustably secured to the crosshead 24, as by stud bolts 26 and lock nuts 27, for forward and rearward adjustment relative to the inner or forward face of said crosshead is a channel-shaped holder 28 having an abrading block 29, of carborundum or other suitable abrasive material, removably secured therein by set screws 30. A metallic plate or strip 31 is interposed between the abrading block 29 and the inner terminals of the set screws 30, to more positively clamp or secure the said block within the correlated holder thereof. The abrading block 29 is preferably provided with an arcuate abrading face 32, to thereby secure a greater area of contact for the spiral blade cutting edges with said abrading face.

Abutting the outer face of the drive wheel 11 and removably secured to the rim of said wheel at diametrically opposed points thereon, as by hook bolts 33, is a crank handle 34 for manually rotating such wheel and the interconnected and correlated spiral cutting blades 13 thereof during the sharpening or abrading of the cutting edges of the latter, said handle having aligned longitudinally spaced slots 35 formed therein, to fit and adjust the same to drive wheels of various diameters, and having an outwardly offset arcuate portion 36, to provide clearance thereat for the hub of the drive wheel.

In the operation of the sharpening apparatus of the invention, to sharpen the cutting edges of the spiral cutting blades of a lawn mower, said mower is inverted so that the left hand drive wheel of the same will be at the right of the operator with the bed or tangential horizontal knife 16 on top of the spiral cutting blades 13 and with the lawn mower handle 17 extending rearwardly. The drive wheels and pinions of the lawn mower are removed and the vertically adjustable wooden roller thereof disconnected from the slotted terminals of the end frame members 10 and replaced thereat by the vertically adjustable guide bar 18 having the portion 19 and longitudinally adjustable member 21 thereof mounted and secured in selected vertically adjusted positions upon the said slotted terminals, whereby said guide bar is disposed in spaced parallel relation to the spiral cutting blades 13, and the axis of the guide bar is disposed in the same horizontal plane as the axis of the driven shaft 13 of said blades. The channel-shaped holder 28 is adjusted in an obvious manner upon the crosshead 24 so that the arcuate abrading face 31 of the abrading block 29 will have proper abrading contact with the cutting edges of the spiral cutting blades 13 during the abrading operation. The right-hand pinion 14 of the lawn mower is placed upon the transposed left-hand end of the driven shaft 12 with the dog 15 of said pinion reversely disposed within said shaft. The drive wheel 11 is operatively positioned upon the lawn mower with the internal gear teeth of said wheel meshing with the teeth of the pinion 14. The crank handle 33 is rigidly secured in an obvious manner to the rim of the drive wheel 11. With the mechanism of the lawn mower and sharpening apparatus in the abrading position, as hereinbefore described, the crank handle 33 is turned by the operator to rotate the drive wheel 11 in the direction indicated by the arrows in Figs. 2 and 5, and through the media of the pinion 14 and reversed dog 15 such rotative movement of the drive wheel is imparted to the spiral cutting blades 13 to rotate such blades in the same direction, which latter is the reverse to the normal rotative movement of said blades. Concurrently with the rotation of the blades 13 the crosshead 24 is reciprocated upon the guide bar 18 by the operator in an obvious manner, the amount of reciprocative movement given said crosshead being such that the abrading block 29 associated therewith and in tangential abrading contact with the cutting edges of the spiral cutting blades is caused to travel the full length of such blades to thus insure of the said edges being uniformly and evenly abraded or sharpened. The spiral cutting blades 13 are rotated and the abrading block 29 reciprocated thereon until all of the cutting edges of said blades are sharpened and are in a uniform circumferential plane. Upon completion of the abrading operation the guide bar 18 and the crank handle 33 are detached from the lawn mower, the drive wheel 11, pinion 14 and dog 15 are removed and the several operative parts of the lawn mower reassembled in a well known manner for normal operation.

From the foregoing it will be obvious and apparent, that the apparatus of the invention is extremely simple, durable and economical in construction, is convenient to use, is efficient, positive and reliable in operation, will not readily get out of order, and conserves much time and energy in accurately and uniformly abrading and sharpening the cutting edges of lawn mower spiral cutting blades.

While I have herein shown and described my invention with sufficient detail to enable those skilled in the art to understand the mode of construction and the principles involved, it is to be understood that there is no intentional limitation herein to the specific form and precise details of construction of the invention herein shown and described, except as expressly defined by the appended claims, and that various modifications of said construction may be resorted to without departing from the invention, or the benefits derivable therefrom. I also desire to have it understood that certain features of the invention herein disclosed may be employed in other combinations than those herein shown.

Having thus fully described my invention, what I claim as new and desire to secure by Letters Patent is:

A sharpening apparatus for a lawn mower comprising a guide bar rectangular in cross-section having one end bent upwardly and perforated for adjustable attachment to the mower, an upwardly extending perforated member slidably disposed for longitudinal adjustment upon the opposite end of said bar for adjustably attaching said end to the mower, a manually reciprocable crosshead mounted upon said guide bar having a handle mounted thereon, a channel-shaped holder adjustably mounted upon the inner face of said crosshead for forward and rearward movement relative thereto, a block of abrasive material mounted within said holder having a concaved abrading face, and means to clamp said block within said holder.

In testimony whereof I affix my signature.

CARL KNAUF.